United States Patent
Lin

(10) Patent No.: US 12,159,405 B2
(45) Date of Patent: Dec. 3, 2024

(54) METHOD FOR DETECTING MEDICAL IMAGES, ELECTRONIC DEVICE, AND STORAGE MEDIUM

(71) Applicant: HON HAI PRECISION INDUSTRY CO., LTD., New Taipei (TW)

(72) Inventor: Tzu-Chen Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 362 days.

(21) Appl. No.: 17/896,829

(22) Filed: Aug. 26, 2022

(65) Prior Publication Data

US 2023/0386023 A1    Nov. 30, 2023

(30) Foreign Application Priority Data

May 24, 2022  (CN) .......................... 202210571810.7

(51) Int. Cl.
*G06T 7/00*    (2017.01)
(52) U.S. Cl.
CPC .. *G06T 7/0012* (2013.01); *G06T 2207/10116* (2013.01); *G06T 2207/20081* (2013.01); *G06T 2207/20084* (2013.01); *G06T 2207/30061* (2013.01); *G06T 2207/30096* (2013.01)
(58) Field of Classification Search
CPC .... G06N 3/045; G06N 3/0455; G06N 3/0464; G06T 2207/30096; G06T 7/0012; G06T 2207/10116; G06T 2207/20081; G06T 2207/20084; G06T 2207/30061
See application file for complete search history.

(56) References Cited

U.S. PATENT DOCUMENTS

| 2021/0090247 A1* | 3/2021 | Jeon | G06N 3/047 |
| 2021/0224977 A1* | 7/2021 | Jia | G06F 18/24 |
| 2021/0233239 A1* | 7/2021 | Li | G16H 30/40 |

(Continued)

FOREIGN PATENT DOCUMENTS

| CN | 112561918 | 3/2021 |
| CN | 113011562 | 6/2021 |

OTHER PUBLICATIONS

Rashid et al., "AutoCovNet: Unsupervised feature learning using autoencoder and feature merging for detection of COVID-19 from chest X-ray images", Oct. 2021 (Year: 2021).*

(Continued)

*Primary Examiner* — Dung Hong
(74) *Attorney, Agent, or Firm* — ScienBiziP, P.C.

(57) ABSTRACT

A method for detecting medical images implemented in an electronic device includes obtaining at least one image to be detected; obtaining a reconstructed image by inputting the at least one image to be detected as a target image into a pre-trained variational autoencoder model; determining a target area according to pixel values of pixels in the reconstructed image and the target image; obtaining a feature area and a lesion category of the feature area by inputting the target image into a pre-trained convolutional neural network model; when there is a feature area corresponding to the target area in the target image, determining a lesion area and a corresponding lesion category based on the target area and the feature area, and generating a detection result of the image to be detected.

20 Claims, 4 Drawing Sheets

(56) References Cited

U.S. PATENT DOCUMENTS

| | | | |
|---|---|---|---|
| 2023/0229927 A1* | 7/2023 | Kim | G06N 3/09 382/128 |
| 2023/0230228 A1* | 7/2023 | Liu | G06N 3/0455 |
| 2024/0038391 A1* | 2/2024 | Nosato | G06T 7/00 |
| 2024/0249395 A1* | 7/2024 | Datta | G06N 3/0475 |

OTHER PUBLICATIONS

Silva et al, "Pre-Training Autoencoder for Lung Nodule Malignancy Assessment Using CT Images", Nov. 2020 (Year: 2020).*

Zhou et al., "WVALE: Weak variational autoencoder for localisation and enhancement of COVID-19 lung infections", May 2022 (Year: 2022).*

* cited by examiner

METHOD FOR DETECTING MEDICAL IMAGES, ELECTRONIC DEVICE, AND STORAGE MEDIUM

FIELD

The subject matter herein generally relates to image processing, and particularly to an electronic device, a method for detecting medical images, and a storage medium.

BACKGROUND

Medical images are viewed by doctors, for example, a doctor may only frame the lesion area on a medical image and determine a possible lesion category corresponding to the lesion area by their personal experience. Personal experience is valuable, however, recognitions and analyses of features in medical images may be improved for better accuracy.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
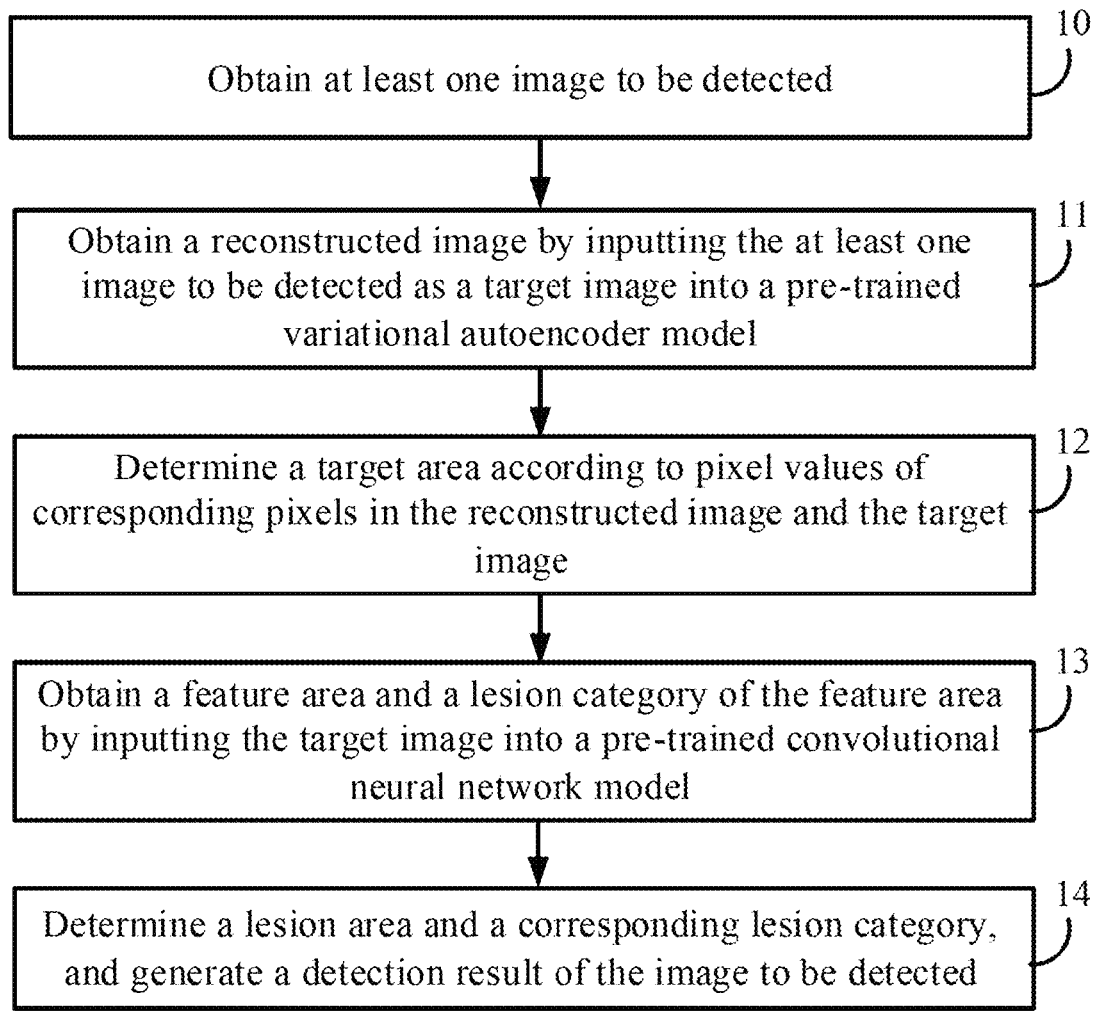
FIG. 1 illustrates a flowchart of an embodiment of a method for detecting medical images according to the present disclosure.

Multiple embodiments are described in the present disclosure, but the description is exemplary rather than limiting, and there may be more embodiments and implementation solutions within the scope of the embodiments described in the present disclosure. Although many possible combinations of features are shown in the drawings and discussed in the detailed description, many other combinations of the disclosed features are also possible. Unless specifically limited, any feature or element of any embodiment may be used in combination with or in place of any other feature or element of any other embodiment.

When describing representative embodiments, the specification may present methods and/or processes as a specific sequence of steps. However, to the extent that the method or process does not depend on the specific order of steps described in the present disclosure, the method or process should not be limited to the specific order of steps described. As understood by those of ordinary skills in the art, other orders of steps are also possible. Therefore, the specific order of steps set forth in the specification should not be interpreted as limitation to the claims. In addition, the claims for the method and/or process should not be limited to the steps performed in the written order, and those of skilled in the art may readily understand that these orders may vary and still remain within the essence and scope of the embodiments of the present disclosure.

Unless otherwise defined, technical terms or scientific terms used in the embodiments shall have common meanings as construed by those of ordinary skills in the art to which the present disclosure pertains. The terms "first", "second" and the like used in the embodiments of the present disclosure do not represent any order, quantity, or importance, but are merely used to distinguish different components. The terms "include", "contain" or the like mean that elements or articles appearing before such terms cover elements or articles listed after the words and their equivalents without excluding other elements or articles. The terms "connect", "link" or the like are not limited to physical or mechanical connection, but may include electrical connections, whether direct or indirect.

An electronic device 1 may be an electronic device with a medical image detection program installed, such as a personal computer, a server, etc., the server may be a single server, a server cluster, or the like.

In one embodiment, the electronic device 1 can be in a wired network environment or in a wireless network environment. The wireless network can be radio, WI-FI, or cellular network. The cellular network can be a 4G network or a 5G network.

In one embodiment, the electronic device 1 may include at least one network device and/or at least one user device. The network device includes, but is not limited to, a single network server, a server group including a number of network servers, or cloud including a large number of hosts or web servers based on cloud computing.

FIG. 1 illustrates a flowchart of an embodiment of a method for detecting medical images. The method is provided by way of example, as there are a variety of ways to carry out the method. Each block shown in FIG. 1 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 10.

At block 10, obtaining at least one image to be detected.

In one embodiment, the image to be detected may be an X-ray image of lungs that is required to be detected.

In one embodiment, the electronic device obtains the image to be detected from a preset first database. The first database may be a database such as ChestX-ray14, LIDC-IDRI etc.

At block 11, obtaining a reconstructed image by inputting the at least one image to be detected as a target image into a pre-trained variational autoencoder model.

In one embodiment, the target image may be an image generated after performing a balance contrast enhancement process on the image to be detected.

In one embodiment, before inputting the target image into the pre-trained variational autoencoder model, the method further includes preprocessing the target image.

In detail, preprocessing the target image includes: the electronic device traversing the pixel values of all pixels in the image to be detected, and determining a maximum grayscale value and a minimum grayscale value in the image to be detected from the pixel values of all pixels in the image to be detected, the electronic device further calculates a sum of the pixel values of all pixels in the image to be detected, and obtaining the grayscale average value by calculating a ratio of the sum of the pixel values to the number of all the pixels, the electronic device further calculating a mean sum of square according to the number of all pixels and the pixel value of each pixel in the image to be detected, the electronic device further generating a first value according to the maximum grayscale value, the minimum grayscale value, the grayscale average value, the mean sum of square, a preset maximum grayscale value, a preset minimum grayscale value, and a preset grayscale average value, the electronic device further generating a second value according to the preset maximum grayscale value, the preset minimum grayscale value, the maximum grayscale value, the minimum grayscale value, and the first value, the electronic device generating a third value according to the preset minimum grayscale value, the minimum grayscale value, the first value, and the second value, the electronic device further generating a target pixel value corresponding to each pixel according to the pixel value of each pixel in the image to be detected, the first value, the second value, and the third value, and generating a target image according to each pixel and the target pixel value of each pixel.

In one embodiment, the target pixel value is calculated by the following formula:

$$Y=A(X-B)^2+C \quad \text{(formula (1))};$$

In the formula (1), Y is the target pixel value, A is the second value, is the pixel value corresponding to any pixel in the image to be detected, B is the first value, and C is the third value.

In one embodiment, the mean sum of square is calculated by the following formula:

$$s = \frac{1}{N}\sum_{i=1}^{N} x_i^2. \quad \text{(formula (2))}$$

In the formula (2), N is the number of all pixels in the image to be detected, I is the i-th pixel in the image to be detected, and $x_i$ is the pixel value of the i-th pixel in the image to be detected.

In one embodiment, the first value is calculated by the following formula:

$$B = \frac{h^2*(E-L)-s*(H-L)+l^2*(H-E)}{2[h*E-L)-e*(H-L)+l*(H-E)]}. \quad \text{(formula (3))}$$

In the formula (3), B is the first value, h is the maximum grayscale value, l is the minimum grayscale value, E is the preset grayscale average value, H is the preset maximum grayscale value, L is the preset minimum grayscale value, s is the mean square sum, and e is the grayscale average value.

In one embodiment, the second value is calculated by the following formula:

$$A = \frac{H-L}{(h-l)*(h+l-2*B)}; \quad \text{(formula (4))}$$

In the formula (4), A the second value.

In one embodiment, the third value is calculated by the following formula:

$$C=L-A*(l-B)^2 \quad \text{(formula (5))};$$

In the formula (5), C is the third value.

In one embodiment, the preset maximum grayscale value and the preset minimum grayscale value may be predetermined according to requirements. The preset grayscale average value may be calculated from the preset maximum grayscale value and the preset maximum grayscale value, and the formula for calculating the preset grayscale average value and for the grayscale average value is the same.

Figure 2:
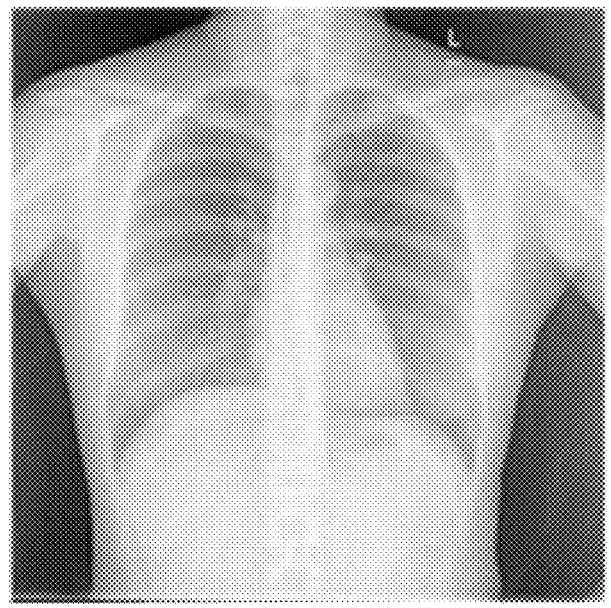
FIG. 2 is a schematic view of an embodiment of an image to be detected according to the present disclosure.

Referring to FIG. 2, the image to be detected is an image of a lung, and it can be seen from FIG. 2 that the contrast of the image to be detected is low, so that the lung area in the image to be detected is indistinct and relatively blurred.

Figure 3:
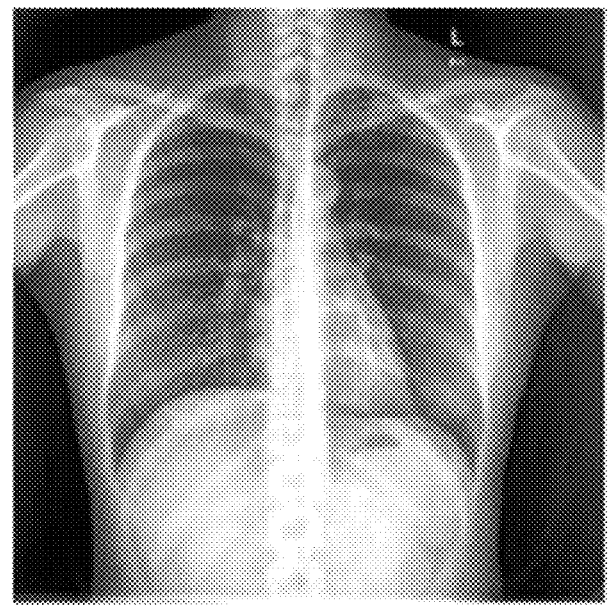
FIG. 3 is a schematic view of an embodiment of a target image according to the present disclosure.

It can be seen from FIG. 3 that the contrast of the image to be detected is enhanced, the bright areas are brighter, the dark areas are darker, the target image is clearer, and the black lung area in the image is more prominent.

Since the preset maximum grayscale value and the preset minimum grayscale value may be adjusted, increasing the preset maximum grayscale value and decreasing the preset minimum grayscale value increases the difference between the two, and increases the contrast of the image to be detected, thereby improving the brightness and sharpness of the image to be detected. Thereby, the brightness and sharpness of the generated target image may be controlled.

In one embodiment, the pre-trained variational autoencoder model is a model generated after training by normal lung X-ray images, the normal lung X-ray images are images of lung without any lesions. The normal lung X-ray images may be obtained from the first database.

In one embodiment, the reconstructed image is an image generated after the target image is reconstructed by the pre-trained variational autoencoder model.

In one embodiment, before a reconstructed image is obtained by inputting the image to be detected as a target image into a pre-trained variational autoencoder model, the method further includes: the electronic device establishing a variational learner, and obtaining X-ray images of normal lung, the electronic device further preprocessing the X-ray images of normal lung, and training the variational learner according to the preprocessed X-ray images of normal lung, the electronic device further calculating a loss value of the variational learner, and the pre-trained variational autoencoder model is determined when the loss value drops to a minimum.

In one embodiment, the loss value is calculated based on structural similarity.

In one embodiment, the pre-trained variational autoencoder model includes an encoder and a decoder.

In one embodiment, obtaining a reconstructed image by inputting the image to be detected as a target image into a pre-trained variational autoencoder model includes: the electronic device obtaining a feature vector by inputting the target image into the encoder for feature extraction, there are 2n elements in the feature vector, the electronic device extracting the first n elements in the feature vector as a mean vector, and extracting the last n elements in the feature vector as a standard deviation vector, the electronic device further generating a Gaussian random number according to the mean vector and the standard deviation vector, obtaining a sampled value by randomly sampling the Gaussian random number, and obtaining a number of multiplication results by multiplying each element in the mean vector with the sampled value, the electronic device further obtaining a latent vector by adding each multiplication result with a corresponding element in the standard deviation vector, and obtaining the reconstructed image by inputting the latent vector into the decoder for a mapping process.

In one embodiment, the Gaussian random number may be generated by a Box-Muller algorithm according to the mean vector and the standard deviation vector.

The pre-trained variational autoencoder model is used to perform feature extraction on the target image to obtain the latent vector, and important features in the target image can be extracted and compressed. In the process of compression, the influence of image noise is reduced, which can make the reconstructed image clearer. Since the pre-trained variational autoencoder model is generated by training the X-ray images of normal lungs, the pre-trained variational autoencoder model thus learns the features of the X-ray images of the normal lung, so that the reconstructed image is approximately the X-ray image of a normal lung.

At block 12, determining a target area according to pixel values of corresponding pixels in the reconstructed image and the target image.

In one embodiment, the target area includes areas having pixels of which pixel absolute value is greater than a first preset threshold, the pixel absolute value is an absolute value of the difference between the pixel value of each pixel in the reconstructed image and the pixel value of the corresponding pixel in the target image.

In one embodiment, determining a tartlet area according to pixel values of corresponding pixels in the reconstructed image and the target image includes: the electronic device obtaining a pixel difference value by subtracting the pixel value of each pixel in the reconstructed image from the pixel value of the corresponding pixel in the target image, and obtaining the pixel absolute value by determining an absolute value of the pixel difference value, the electronic device further determining the pixel absolute values that are greater than the first preset threshold the target absolute values, and determining an area formed by a number of adjacent target absolute values in the target image as the target area.

In one embodiment, the first preset threshold may be preset according to user requirement. A shape of the target area may be a rectangle or other irregular shapes.

Figure 4:
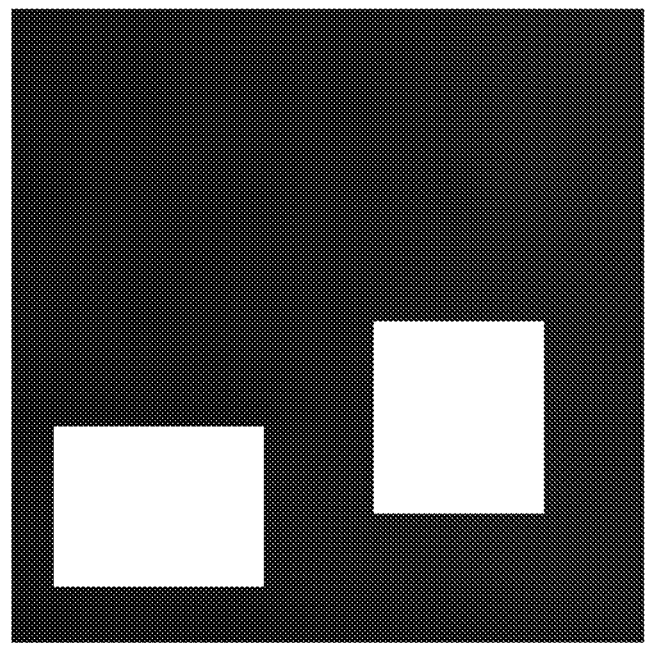
FIG. 4 is a schematic view of an embodiment of a target area according to the present disclosure.

Referring to FIG. 4, there are two target areas, each of which is rectangular.

Since the reconstructed image is approximately an image of a normal lung, the pixel difference value in the target area is larger when the target image has a lesion area. Determining the absolute value of the pixel difference value may ensure that signs of the absolute values of the pixels are unified, so that the target area may more accurately reflect the difference between the target image and the reconstructed image.

At block 13, obtaining a feature area and a lesion category of the feature area by inputting the target image into a pre-trained convolutional neural network model.

In one embodiment, the pre-trained convolutional neural network model is a model generated after training a pre-established convolutional neural network using X-ray images of abnormal lungs. The X-ray images of abnormal lung are images of a lung with lesions, the lesion area and the lesion category of the lesion area are marked in the X-ray image of abnormal lung, the X-ray images of abnormal lungs being obtained from a preset second database.

In one embodiment, the pre-trained convolutional neural network model may be a fully convolutional neural network.

For example, a replaced deep convolutional neural network is obtained by replacing a fully connected layer in a deep convolutional neural network with convolutional layers, and the pre-trained convolutional neural network model is obtained by training the replaced deep convolutional neural network based on the X-ray images of abnormal lungs.

In one embodiment, the deep convolutional neural network may include, but is not limited to, ResNet, GoogleNet, and VGGNet.

In one embodiment, before obtaining a feature area and a lesion category of the feature area by inputting the target image into a pre-trained convolutional neural network model, the method further includes: the electronic device obtaining a number of lesion categories and a number of preset ranges, and establishing a relationship between each preset range and each lesion category. The preset range can be preset based on user requirements.

For example, the number of lesion categories may include pulmonary nodules and pneumonia, the preset range corresponding to the pulmonary nodule may be [0.6, 0.8], and the preset range corresponding to the pneumonia may be (0.8, 1].

In one embodiment, obtaining a feature area and a lesion category of the feature area by inputting the target image into a pre-trained convolutional neural network model includes: the electronic device generating a heat map by extracting features of the target image, obtaining the heat pixel value of each pixel in the heat map, and determining the pixels of which pixel value is greater than the second preset threshold to be the target pixels, the electronic device further determining the preset range to which each target pixel belongs by comparing the heat pixel value of each target pixel with the number of preset ranges, determining the area formed by a number of adjacent target pixels belonging to the same preset range in the target image as the feature area, and determining the lesion category corresponding to the feature area according to the preset range to which the pixels in the feature area belong and the relationship between each preset range and each lesion category.

In one embodiment, the lesion categories may include, but are not limited to, pulmonary nodules, pneumonia, pulmonary effusion. It can be understood that the image to be detected may include a number of lesion categories. The second preset threshold may include, but is not limited to, 0.7 and 0.8. A shape of the feature area may be an ellipse, or may be other irregular shape.

In one embodiment, upon determining the pixels whose pixel value is greater than the second preset threshold to be the target pixel point, the pixels corresponding to the lesion area may then be preliminarily determined. By comparing the pixel value of each target pixel with the number of preset ranges, the preset range to which each target pixel belongs may be determined, and the lesion category corresponding to each target pixel can be quickly determined according to the relationship between each preset range and each lesion category.

In detail, the convolutional neural network model includes a number of convolutional layers and a global average pooling layer. Generating a heat map by extracting features of the target images includes: the electronic device extracting the features of the image to be detected according to the number of convolutional layers, obtaining a number of feature maps output by the last convolutional layer, and determining the lesion category of the target image and a probability of the lesion category based on the number of feature maps and the global average pooling layer classifying the target image, the electronic device further performing a reverse gradient calculation on the number of feature maps based on the lesion category and the probability of the lesion category, obtaining the weighting of each feature map, and obtaining the heat map by and calculating a weighted sum of the feature maps based on the weighting of each feature map.

In one embodiment, the weighting is calculated according to the following formula:

$$\alpha_k^c = \frac{1}{z}\sum_i \frac{\partial y^c}{\partial x_i^k}; \quad \text{(formula (6))}$$

In the formula (6), $\alpha_k^c$ is the weighting corresponding to the k-th feature map, Z is the number of pixels of the k-th feature map, i is the i-th pixel point in the k-th feature map, $y^c$ is the probability of the lesion category of the target image, $x_i^k$ is the pixel value of the i-th pixel of the k-th feature map, and $$\frac{\partial y^c}{\partial x_i^k}$$

is the partial derivative of the probability of the lesion category to the pixel value of the i-th pixel of the k-th feature map.

In detail, the heat map is the calculated according to the following formula:

$$L_{Grad\text{-}DAM} = \text{ReLu}(\Sigma_k \alpha_k^c x^k) \quad \text{(formula (7))};$$

In the formula (7), $L_{Grad\text{-}DAM}$ is the heat map, ReLu is a linear rectification function, and $x^k$ is the k-th feature map.

In one embodiment, the heat pixel value of each pixel in the heat map represents the probability of the lesion category to which the pixel belongs. It can be understood that the range of the heat pixel value of each pixel in the heat map is [0, 1].

In detail, determining the lesion category of the target image and a probability of the lesion category based on the number of feature maps and the global average pooling layer classifying the target image includes: the electronic device inputting the number of feature maps into the global average pooling layer, obtaining a number of predicted categories and the probability of each predicted category, determining the predicted category with the largest probability to be the lesion category of the tartlet image, and determining that the largest probability is the probability of the lesion category.

Since the heat pixel value of each pixel in the heat map represents the probability of the lesion category to which the pixel belongs, the larger the heat pixel value in the heat map, the greater is the possibility of the pixels corresponding to the heat pixel value being a lesion, so that the pixels that may represent the lesion in the heat map can be preliminarily determined.

At block 14, when there is a feature area corresponding to the target area in the target image, determining a lesion area and a corresponding lesion category based on the target area and the feature area, and generating a detection result of the image to be detected.

In one embodiment, the detection result may include a lesion area in the image to be detected and a lesion category corresponding to the lesion area. The detection result may also include the image to be detected as not having any lesion area.

In one embodiment, determining a lesion area and a corresponding lesion category based on the target area and the feature area, and generating a detection result of the image to be detected includes: the electronic device selecting a common area of the target area and the feature area corresponding to the target area in the target image, determining the common area as the lesion area, and determining the lesion area and the lesion category corresponding to the feature area as the detection result of the image to be detected. The common area is selected by using a box.

In one embodiment, the color of the target pixel in the heat map is different from that of other pixels, for example, the color of the target pixel may be orange-red, and the colors of other pixels may be light blue and yellow.

Figure 5:
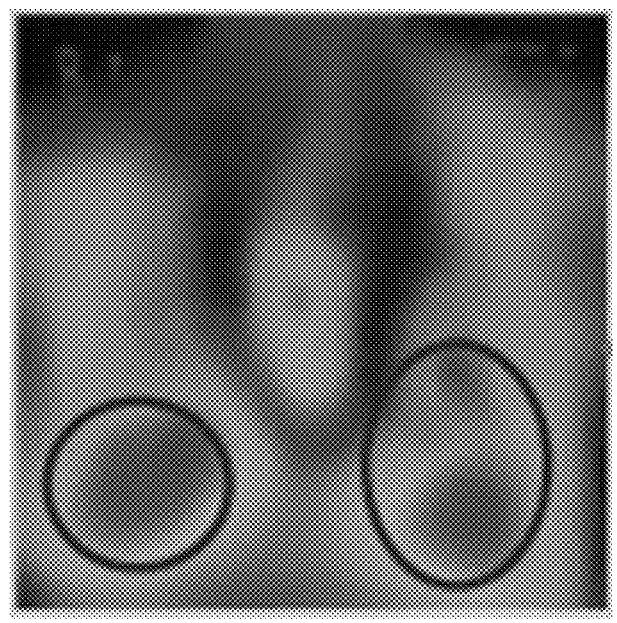
FIG. 5 is a schematic view of an embodiment of a feature area according to the present disclosure.

Referring to FIG. 5, there are two ellipses, each ellipse is a feature area, and each feature area contains a number of target pixels. The color of the target pixel is different from the color of other pixels, and this color difference is obvious, the color of the feature regions is more obvious, and the positions of the two feature areas are basically the same as the positions of the target areas in FIG. 4. Therefore, each target region in FIG. 4 has a corresponding feature region in FIG. 5.

In one embodiment, when the target area does not have a corresponding feature area in the target image, such target area is thereby shown to be erroneous.

It can be further determined whether the feature area corresponding to the target area includes a lesion based on the target area, and the common area can be determined as a lesion area. This can be determined based on the target area and the feature area corresponding to the target area. The accurate range of the lesion area is determined, thereby improving the detection accuracy.

It can be seen from the above technical solutions that the image to be detected is preprocessed to obtain the target image. The preprocessing can improve the contrast of the image to be detected, the image to be detected can be clearer, and since the variational autoencoder model is generated after training based on normal lung images, the generated reconstructed images are equivalent to normal lung images. The target area is determined according to the pixel values of the corresponding pixels in the reconstructed image and the target image. Therefore, the target area better represents the difference between the target image and the normal lung image. A preliminary selection of the position of the lesion in the target image can be made when the image is inputted into the pre-trained convolutional neural network model to obtain the feature area and the lesion category of the feature area, and this step can detect whether there is a lesion in the target image. In relation to the feature area corresponding to the target area, it can be further determined whether the feature area contains a lesion based on the target area. When there is no feature area corresponding to the target area in the target image, it can be determined that the target area includes feature areas but is without lesions, which reduces the detection error and thus improves the detection accuracy. When there is a feature area corresponding to the target area in the target image, the lesion area and the corresponding lesion category can be determined based on the target area and the feature area, and the accurate area of the lesion area can be determined.

Figure 6:
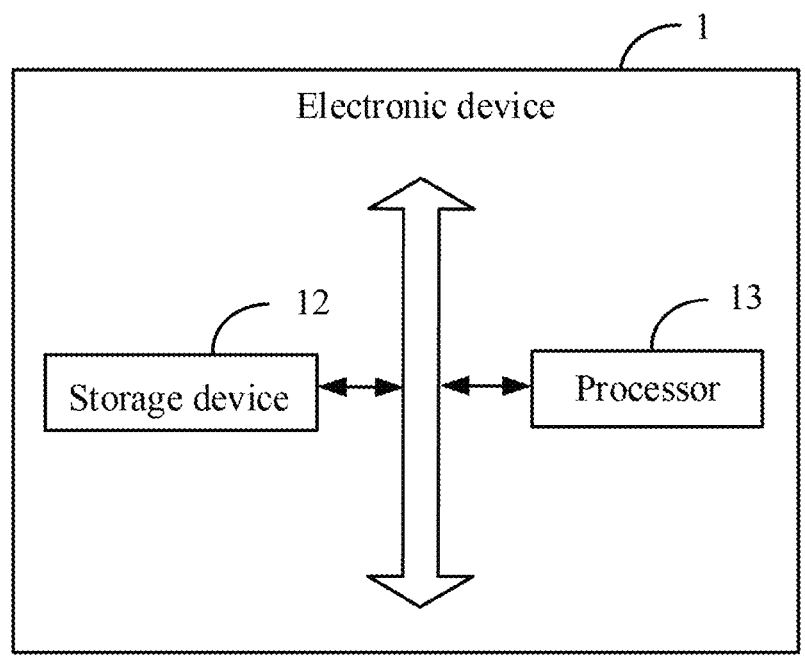
FIG. 6 is a block diagram of an embodiment of an electronic device according to the present disclosure.

FIG. 6 illustrates the electronic device 1 in one embodiment. The electronic device 1 includes, but is not limited to, a processor 13, a storage device 12, and a computer program. FIG. 6 illustrates only one example of the electronic device 1. Other examples can include more or fewer components than as illustrated or have a different configuration of the various components in other embodiments.

The processor 13 can be a central processing unit (CPU), a microprocessor, or other data processor chip that performs functions in the electronic device 1.

In one embodiment, the storage device 12 can include various types of non-transitory computer-readable storage mediums. For example, the storage device 12 can be an internal storage system, such as a flash memory, a random access memory (RAM) for the temporary storage of information, and/or a read-only memory (ROM) for permanent storage of information. The storage device 12 can also be an external storage system, such as a hard disk, a storage card, or a data storage medium.

The storage device 12 stores instructions, the processor 13 executes the computer program stored in the storage device 12 for implementing the method for detecting medical images provided in the embodiments of the present disclosure. The computer program 30 is a medical image detection program and includes instructions.

Upon execution of the instructions stored in the storage device 12, the processor 13 is configured to:
 obtain at least one image to be detected;
 obtain a reconstructed image by input the at least one image to be detected as a target image into a pre-trained variational autoencoder model;
 determine a target area according to pixel values of corresponding pixels in the reconstructed image and the target image;
 obtain a feature area and a lesion category of the feature area by inputting the target image into a pre-trained convolutional neural network model;
 when there is a feature area corresponding to the target area in the target image, determine a lesion area and a corresponding lesion category based on the target area and the feature area, and generate a detection result of the image to be detected.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. An electronic device comprising:
 at least one processor; and
 a storage device coupled to the at least one processor and storing instructions for execution by the at least one processor to cause the at least one processor to:
 obtain at least one image to be detected;
 obtain a reconstructed image by inputting the at least one image to be detected as a target image into a pre-trained variational autoencoder model;
 determine a target area according to pixel values of pixels in the reconstructed image and the target image;
 obtain a feature area and a lesion category of the feature area by inputting the target image into a pre-trained convolutional neural network model;
 in response that there is a feature area corresponding to the target area in the target image, determine a lesion area and a corresponding lesion category based on the target area and the feature area, and generate a detection result of the image to be detected.

2. The electronic device according to claim 1, wherein the at least one processor is further caused to:
 traverse the pixel values of all pixels in the image to be detected, and determine a maximum grayscale value and a minimum grayscale value in the image to be detected;
 calculate a sum of the pixel values of all pixels in the image to be detected, and obtain a grayscale average value by calculating a ratio of the sum to the number of all of the pixels;
 calculate a mean square sum according to the number of all of the pixels and the pixel value of each pixel in the image to be detected;
 generate a first value according to the maximum grayscale value, the minimum grayscale value, the grayscale average value, the mean square sum, a preset maximum grayscale value, a preset minimum grayscale value, and a preset grayscale average value;
 generate a second value according to the preset maximum grayscale value, the preset minimum grayscale value, the maximum grayscale value, the minimum grayscale value, and the first value;
 generate a third value according to the preset minimum grayscale value, the minimum grayscale value, the first value, and the second value;
 generate a target pixel value corresponding to each pixel according to the pixel value of each pixel in the image to be detected, the first value, the second value, and the third value; and
 generate the target image according to each pixel and the target pixel value of each pixel.

3. The electronic device according to claim 2, wherein the target pixel value is calculated by the following formula:

$$Y=A(X-B)^2+C;$$

wherein Y is the target pixel value, A is the second value, X is the pixel value corresponding to any pixel in the image to be detected, B is the first value, C is the third value.

4. The electronic device according to claim 1, wherein the at least one processor is further caused to:
 establish a variational learner, and obtain X-ray images of normal lungs;
 preprocess the X-ray images of normal lungs; and
 train the variational learner according to the preprocessed X-ray images of normal lungs, and calculate a loss value of the variational learner, the pre-trained variational autoencoder model is obtained until the loss value drops to a minimum.

5. The electronic device according to claim 1, wherein the at least one processor is further caused to:
 obtain a pixel difference value by subtracting a pixel value of each pixel in the reconstructed image from a pixel value of a corresponding pixel in the target image;
 obtain a pixel absolute value by determining an absolute value of the pixel difference value; and
 determine the pixel absolute value that is greater than a first preset threshold as a target absolute value, and determine an area formed by a plurality of adjacent target absolute values in the target image as the target area.

6. The electronic device according to claim 5, wherein the at least one processor is further caused to:
 obtain a plurality of lesion categories and a plurality of preset ranges, and
 establish a relationship between each preset range and each lesion category.

7. The electronic device according to claim 6, wherein the at least one processor is further caused to:
 generate a heat map by extracting features of the target image;
 obtain a heat pixel value of each pixel in the heat map, and determine pixels with a pixel value being greater than a second preset threshold to be target pixels;
 determine a preset range to which each target pixel belongs by comparing the heat pixel value of each target pixel with the plurality of preset ranges;

determine an area formed by a plurality of adjacent target pixels belonging to a same preset range in the target image as a feature area; and determine the lesion category corresponding to the feature area according to the preset range to which the pixels in the feature area belong and the relationship.

8. The electronic device according to claim 1, wherein the at least one processor is further caused to:

select a common area of the target area and the feature area corresponding to the target area in the target image, and determine the common area as a lesion area; and determine the lesion area and the lesion category corresponding to the feature area as the detection result of the image to be detected.

9. A method for detecting medical images implemented in an electronic device comprising:

obtaining at least one image to be detected;

obtaining a reconstructed image by inputting the at least one image to be detected as a target image into a pre-trained variational autoencoder model;

determining a target area according to pixel values of pixels in the reconstructed image and the target image;

obtaining a feature area and a lesion category of the feature area by inputting the target image into a pre-trained convolutional neural network model; and in response that there is a feature area corresponding to the target area in the target image, determining a lesion area and a corresponding lesion category based on the target area and the feature area, and generating a detection result of the image to be detected.

10. The method according to claim 9, further comprising:

traversing the pixel values of all pixels in the image to be detected, and determining a maximum grayscale value and a minimum grayscale value in the image to be detected;

calculating a sum of the pixel values of all pixels in the image to be detected, and obtaining a grayscale average value by calculating a ratio of the sum to the number of all of the pixels;

calculating a mean square sum according to the number of all of the pixels and the pixel value of each pixel in the image to be detected;

generating a first value according to the maximum grayscale value, the minimum grayscale value, the grayscale average value, the mean square sum, a preset maximum grayscale value, a preset minimum grayscale value, and a preset grayscale average value;

generating a second value according to the preset maximum grayscale value, the preset minimum grayscale value, the maximum grayscale value, the minimum grayscale value, and the first value;

generating a third value according to the preset minimum grayscale value, the minimum grayscale value, the first value, and the second value;

generating a target pixel value corresponding to each pixel according to the pixel value of each pixel in the image to be detected, the first value, the second value, and the third value; and generating the target image according to each pixel and the target pixel value of each pixel.

11. The method according to claim 10, wherein the target pixel value is calculated by the following formula:

$$Y = A(X-B)^2 + C;$$

wherein Y is the target pixel value, A is the second value, X is the pixel value corresponding to any pixel in the image to be detected, B is the first value, C is the third value.

12. The method according to claim 9, further comprising:

establishing a variational learner, and obtaining X-ray images of normal lungs;

preprocessing the X-ray images of normal lungs; and training the variational learner according to the preprocessed X-ray images of normal lungs, and calculating a loss value of the variational learner, the pre-trained variational autoencoder model is obtained until the loss value drops to a minimum.

13. The method according to claim 9, wherein determining a target area according to pixel values of pixels in the reconstructed image and the target image comprises:

obtaining a pixel difference value by subtracting a pixel value of each pixel in the reconstructed image from a pixel value of a corresponding pixel in the target image;

obtaining a pixel absolute value by determining an absolute value of the pixel difference value; and determining the pixel absolute value that is greater than a first preset threshold as a target absolute value, and determining an area formed by a plurality of adjacent target absolute values in the target image as the target area.

14. The method according to claim 13, further comprising:

obtaining a plurality of lesion categories and a plurality of preset ranges, and establishing a relationship between each preset range and each lesion category.

15. The method according to claim 14, wherein obtaining a feature area and a lesion category of the feature area by inputting the target image into a pre-trained convolutional neural network model comprises:

generating a heat map by extracting features of the target images;

obtaining a heat pixel value of each pixel in the heat map, and determining pixels with a pixel value being greater than a second preset threshold to be target pixels;

determining a preset range to which each target pixel belongs by comparing the heat pixel value of each target pixel with the plurality of preset ranges;

determining an area formed by a plurality of adjacent target pixels belonging to the same preset range in the target image as a feature area; and determining the lesion category corresponding to the feature area according to the preset range to which the pixels in the feature area belong and the relationship.

16. The method according to claim 9, wherein determining a lesion area and a corresponding lesion category based on the target area and the feature area, and generating a detection result of the image to be detected comprises:

selecting a common area of the target area and the feature area corresponding to the target area in the target image, and determine the common area as a lesion area; and determining the lesion area and the lesion category corresponding to the feature area as the detection result of the image to be detected.

17. A non-transitory computer-readable storage medium having instructions stored thereon, when the instructions are executed by a processor of an electronic device, the processor is configured to perform a method for detecting medical images, wherein the method comprises:

obtaining at least one image to be detected;

obtaining a reconstructed image by inputting the at least one image to be detected as a target image into a pre-trained variational autoencoder model; determining a target area according to pixel values of pixels in the reconstructed image and the target image;

obtaining a feature area and a lesion category of the feature area by inputting the target image into a pre-trained convolutional neural network model;

in response that there is a feature area corresponding to the target area in the target image, determining a lesion area and a corresponding lesion category based on the target area and the feature area, and generating a detection result of the image to be detected.

18. The non-transitory computer-readable storage medium according to claim 17, wherein the method further comprises:

traversing the pixel values of all pixels in the image to be detected, and determining a maximum grayscale value and a minimum grayscale value in the image to be detected;

calculating a sum of the pixel values of all pixels in the image to be detected, and obtaining a grayscale average value by calculating a ratio of the sum to the number of all of the pixels;

calculating a mean square sum according to the number of all of the pixels and the pixel value of each pixel in the image to be detected;

generating a first value according to the maximum grayscale value, the minimum grayscale value, the grayscale average value, the mean square sum, a preset maximum grayscale value, a preset minimum grayscale value, and a preset grayscale average value;

generating a second value according to the preset maximum grayscale value, the preset minimum grayscale value, the maximum grayscale value, the minimum grayscale value, and the first value;

generating a third value according to the preset minimum grayscale value, the minimum grayscale value, the first value, and the second value;

generating a target pixel value corresponding to each pixel according to the pixel value of each pixel in the image to be detected, the first value, the second value, and the third value; and generating the target image according to each pixel and the target pixel value of each pixel.

19. The non-transitory computer-readable storage medium according to claim 18, wherein the target pixel value is calculated by the following formula:

$$Y=A(X-B)^2+C;$$

wherein Y is the target pixel value, A is the second value, X is the pixel value corresponding to any pixel in the image to be detected, B is the first value, C is the third value.

20. The non-transitory computer-readable storage medium according to claim 17, wherein the method further comprises:

establishing a variational learner, and obtaining X-ray images of normal lungs;

preprocessing the X-ray images of normal lungs; and training the variational learner according to the preprocessed X-ray images of normal lungs, and calculating a loss value of the variational learner, the pre-trained variational autoencoder model is obtained until the loss value drops to a minimum.

* * * * *